United States Patent
Dinh et al.

(10) Patent No.: US 11,514,171 B2
(45) Date of Patent: Nov. 29, 2022

(54) CODE VULNERABILITY DETECTION AND REMEDIATION

(71) Applicant: Dell Products L.P., Round Rock, TX (US)

(72) Inventors: Hung Dinh, Austin, TX (US); Reshma Nair, Bangalore (IN); Gaurav Suwal, Bhaktapur (NP); Vishnu Prabhu Sundarrajan, Bangalore (IN); Farook Shaik, Hyderabad (IN); Nilay Mishra, Shahjahanpur (IN); Manikandan Rathinavelu, Cedar Park, TX (US); Muhammed R. Mohiuddin, Cedar Park, TX (US); Tarun Gupta, Bhiwadi (IN)

(73) Assignee: Dell Products L.P., Round Rock, TX (US)

( * ) Notice: Subject to any disclaimer, the term of this patent is extended or adjusted under 35 U.S.C. 154(b) by 559 days.

(21) Appl. No.: 16/667,044

(22) Filed: Oct. 29, 2019

(65) Prior Publication Data
US 2021/0124830 A1    Apr. 29, 2021

(51) Int. Cl.
*G06F 21/57*    (2013.01)
(52) U.S. Cl.
CPC .................................. *G06F 21/577* (2013.01)
(58) Field of Classification Search
None
See application file for complete search history.

(56) References Cited

U.S. PATENT DOCUMENTS

| | | | | |
|---|---|---|---|---|
| 7,392,545 | B1 * | 6/2008 | Weber | G06F 21/577 |
| | | | | 713/188 |
| 10,579,803 | B1 * | 3/2020 | Mueller | G06F 21/577 |
| 2011/0173693 | A1 * | 7/2011 | Wysopal | G06F 21/577 |
| | | | | 726/19 |
| 2013/0086689 | A1 * | 4/2013 | Laverdiere-Papineau | ............. |
| | | | | G06F 21/54 |
| | | | | 726/25 |

(Continued)

OTHER PUBLICATIONS

Wikipedia, "Abstract Syntax Tree," https://en.wikipedia.org/wiki/Abstract_syntax_tree, Sep. 9, 2019, 4 pages.

(Continued)

*Primary Examiner* — Qing Chen
(74) *Attorney, Agent, or Firm* — Ryan, Mason & Lewis, LLP

(57) ABSTRACT

A method includes receiving code for computer programming, determining whether at least a portion of the code comprises at least one vulnerability, and comparing at least the portion of the code comprising the at least one vulnerability to a knowledge base. The knowledge base comprises (i) a plurality of code fragments comprising a plurality of vulnerabilities; and (ii) a plurality of solutions to prevent corresponding ones of the plurality of vulnerabilities. The method further includes identifying, based on the comparing, a code fragment of the plurality of code fragments matching at least the portion of the code comprising the at least one vulnerability, and executing a solution of the plurality of solutions corresponding to the identified code fragment to prevent the at least one vulnerability in at least the portion of the code.

20 Claims, 12 Drawing Sheets

(56) References Cited

U.S. PATENT DOCUMENTS

| | | | |
|---|---|---|---|
| 2014/0123108 A1* | 5/2014 | Cheluvaraju | G06F 8/77 717/123 |
| 2017/0185783 A1* | 6/2017 | Brucker | H04L 63/1433 |
| 2017/0286692 A1* | 10/2017 | Nakajima | G06F 21/57 |
| 2018/0150742 A1* | 5/2018 | Woulfe | G06N 20/00 |
| 2018/0157842 A1* | 6/2018 | Holz | G06F 16/338 |
| 2018/0225460 A1* | 8/2018 | Nakajima | G06F 21/577 |
| 2019/0121985 A1* | 4/2019 | Hoole | G06F 11/362 |
| 2020/0133756 A1* | 4/2020 | Sun | G06F 11/079 |
| 2020/0175172 A1* | 6/2020 | Parsons | G06F 11/3604 |
| 2020/0394308 A1* | 12/2020 | Angelo | H04L 63/1433 |
| 2021/0209232 A1* | 7/2021 | Shim | G06F 21/577 |
| 2021/0232376 A1* | 7/2021 | Wang | G06N 20/00 |

OTHER PUBLICATIONS

Veracode, "AppSec Knowledge Base," downloaded Sep. 10, 2019, 5 pages.

Marko Anastasov, "CI/CD Pipeline: A Gentle Introduction," https://semaphoreci.com/blog/cicd-pipeline, Mar. 14, 2019, 11 pages.

Wikipedia, "Codebase," https://en.wikipedia.org/wiki/Codebase, Jun. 4, 2019, 3 pages.

Wikipedia, "Commit (Version Control)," https://en.wikipedia.org/wiki/Commit_(version_control), Jul. 16, 2019, 2 pages.

Common Weakness Enumeration (CWE), "Improper Clearing of Heap Memory Before Release ('Heap Inspection') (3.3)," https://cwe.mitre.org/data/definitions/244.html, 2019, 3 pages.

Common Weakness Enumeration (CWE), "Password in Configuration File (3.3)," https://cwe.mitre.org/data/definitions/260.html, 2019, 3 pages.

beyondsecurity.com, "Finding and Fixing Vulnerabilities in Custom Web Code, a High Risk Vulnerability," https://www.beyondsecurity.com/scan_pentest_network_vulnerabilities_custom_web_code, 2019, 6 pages.

Wikipedia, "Integration Testing," https://en.wikipedia.org/wiki/Integration_testing, Aug. 7, 2019, 2 pages.

vulncat.fortify.com, "Mass Assignment: Insecure Binder Configuration," https://vulncat.fortify.com/en/detail? id=desc.dataflow.java.mass_assignment_insecure_binder_configuration, 2019, 4 pages.

Wikipedia, "Unit Testing," https://en.wikipedia.org/wiki/Unit_testing, Sep. 11, 2019, 8 pages.

Wikipedia, "Vulnerability (Computing)," https://en.wikipedia.org/wiki/Vulnerability_(computing), Sep. 6, 2019, 11 pages.

DOCKER.COM, "What is a Container? A Standardized Unit of Software," https://www.docker.com/resources/what-container, 2019, 5 pages.

techopedia.com, "Codebase," https://www.techopedia.com/definition/23962/codebase, 2019, 4 pages.

portswigger.net, "XML External Entity (XXE) Injection," https://portswigger.net/web-security/xxe, 2019, 4 pages.

* cited by examiner

FIG. 3

```
import Algorithmia def language_detector(snippet):
    client = Algorithmia.client(...)
    algo = client.algo(...)
    algo.set_options(timeout=300)
    language_probability = algo.pipe(input).result
    snippet_language = language_probability[0][0]
    print(... + snippet_language)
    return snippet_language
```

FIG. 4

```
import re def removeCJavaComments(snippet):
    snippet = re.sub(..., re.DOTALL), ..., snippet)
    snippet = re.sub(re.compile(...), ..., snippet)
    return snippet def removePythonComments(snippet):
    snippet = str(snippet)
    return re.sub(..., snippet)
```

FIG. 5

```
count_vectorizer = CountVectorizer()
sparse_matrix = count_vectorizer.fit_transform(documents)
doc_term_matrix = sparse_matrix.todense()
df = pd.DataFrame(doc_term_matrix,
        columns=count_vectorizer.get_feature_names(),
        index=['document1', 'document2', 'document3', 'document4', 'inputdocument'])
cosine_result = cosine_similarity(df,df)
for x in range(0, cosine_result.shape[0]):
    for y in range(0, cosine_result.shape[1]):
        if(x < y and cosine_result[x][y] == 1):
            matching_document = df.index[x]
            return solution_dictionary[matching_document]
```

FIG. 6

CODE VULNERABILITY DETECTION AND REMEDIATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing, and more particularly to detection and remediation of vulnerabilities in enterprise systems.

BACKGROUND

Security is an important concern in connection with the functioning of an enterprise. For example, security threats to enterprise and client data may be present due to deficiencies in the source code or codebase of software systems, applications and/or software components of the enterprise. With increasing security threats to organizations from, for example, hackers and malware, maintaining a secure codebase has become a cumbersome and time consuming task. It has become imperative that security scans are applied on a codebase and code vulnerabilities fixed, so that information technology (IT) systems may securely support an enterprise.

In current systems, in order to comply with security guidelines, developers are required to manually and iteratively perform security scans and vulnerability fixes on source code. This challenge increases with requirements that existing deployed codebases are compliant with the latest security standards. Current processes make inefficient use of computer resources, and require a large amount of human intervention, which can lead to unwanted errors and failure to achieve desired elimination of code vulnerabilities.

SUMMARY

Illustrative embodiments of the present disclosure provide techniques for detecting and removing vulnerabilities from code. Embodiments advantageously provide a comprehensive solution to eliminate code vulnerabilities utilizing pattern matching and machine learning to learn and apply vulnerability fixes on codebases.

In one embodiment, a method comprises receiving code for computer programming, determining whether at least a portion of the code comprises at least one vulnerability, and comparing at least the portion of the code comprising the at least one vulnerability to a knowledge base. The knowledge base comprises (i) a plurality of code fragments comprising a plurality of vulnerabilities; and (ii) a plurality of solutions to prevent corresponding ones of the plurality of vulnerabilities. The method further includes identifying, based on the comparing, a code fragment of the plurality of code fragments matching at least the portion of the code comprising the at least one vulnerability, and executing a solution of the plurality of solutions corresponding to the identified code fragment to prevent the at least one vulnerability in at least the portion of the code.

These and other illustrative embodiments include, without limitation, methods, apparatus, networks, systems and processor-readable storage media.

BRIEF DESCRIPTION OF THE DRAWINGS

FIG. 3 depicts a chart including entries of identified code vulnerabilities and solutions for eliminating the code vulnerabilities in an illustrative embodiment.

FIG. 4 depicts example pseudocode for detecting a programming language in an illustrative embodiment.

FIG. 5 depicts example pseudocode for cleaning code in an illustrative embodiment.

FIG. 6 depicts example pseudocode for calculating a cosine distance in an illustrative embodiment.

DETAILED DESCRIPTION

Figure 1:
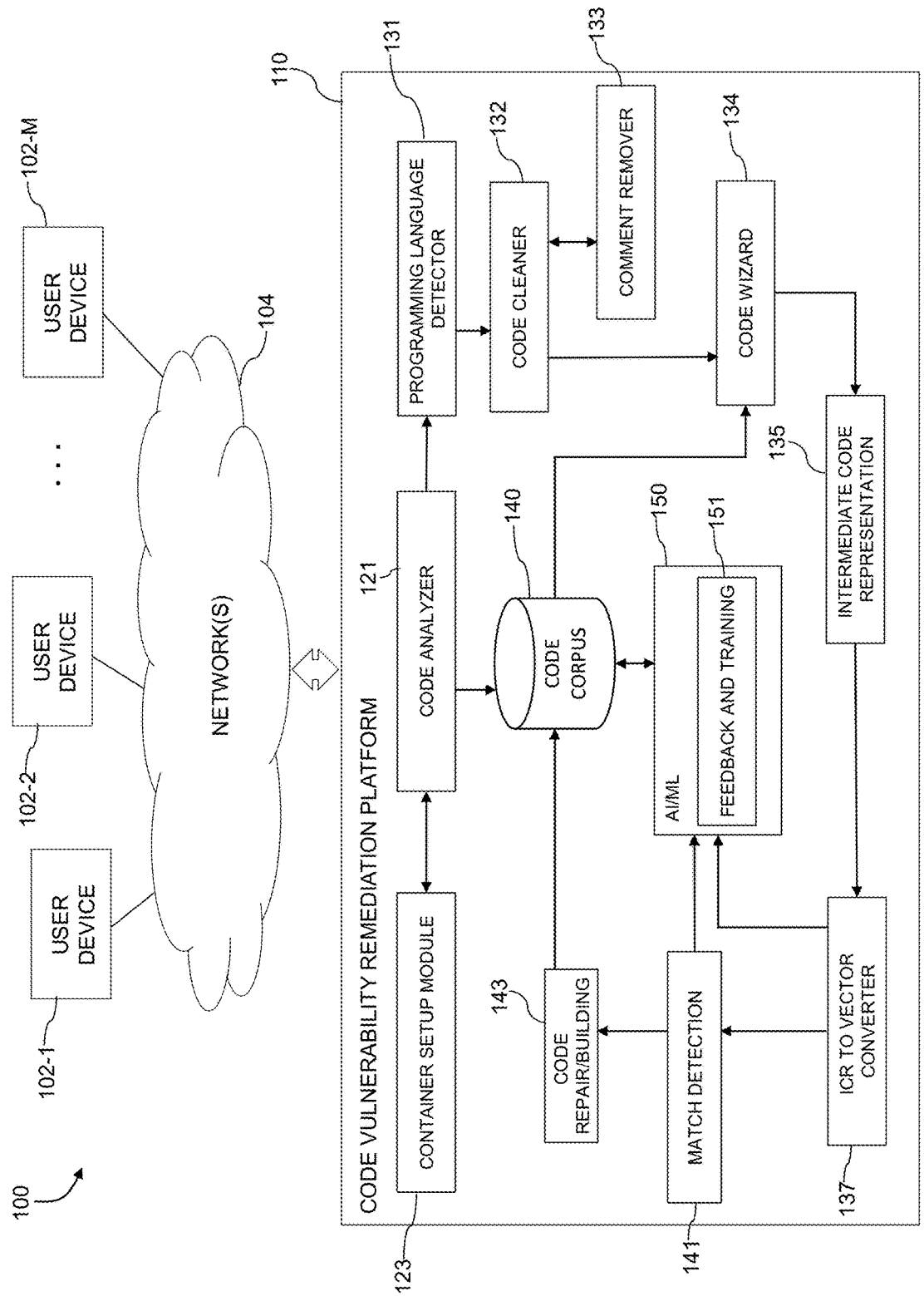
FIG. 1 is a block diagram of an information processing system comprising a code vulnerability remediation platform configured for identifying and eliminating vulnerabilities in code in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "codebase" refers to computer programming code, such as source code used in connection with building, for example, a software system, application or software component. A codebase can include, but is not necessarily limited to, human-written source code files, configuration files and property files. Codebase may be stored in various source code repositories and manipulated by various code editors. Codebase includes, for example, source code for maintaining application functionality.

As used herein, a "vulnerability" or "vulnerabilities" refer to a deficiency, weakness or problem with code which can potentially be exploited to compromise the security of a computer system, application and/or component, and the security of an enterprise and/or individuals associated with the enterprise. Attackers such as, for example, hackers, may exploit vulnerabilities to perform unauthorized actions within a computer system, application and/or component. Vulnerabilities can result in privacy and confidentiality violations and/or problems with the availability of system resources.

FIG. 1 shows an information processing system 100 configured in accordance with an illustrative embodiment. The information processing system 100 comprises user devices 102-1, 102-2, . . . 102-M (collectively "user devices 102"). The user devices 102 communicate over a network 104 with a code vulnerability remediation platform 110.

The user devices 102 can comprise, for example, Internet of Things (IoT) devices, desktop, laptop or tablet computers, mobile telephones, or other types of processing devices capable of communicating with the code vulnerability remediation platform 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable M and other similar index variables herein such as K and L are assumed to be arbitrary positive integers greater than or equal to two.

The term "client" or "user" herein is intended to be broadly construed so as to encompass numerous arrangements of human, hardware, software or firmware entities, as well as combinations of such entities. Code vulnerability remediation services may be provided for users utilizing one or more machine learning models, although it is to be appreciated that other types of infrastructure arrangements could be used. At least a portion of the available services and functionalities provided by the code vulnerability remediation platform 110 in some embodiments may be provided under Function-as-a-Service ("FaaS") and/or Platform-as-a-Service ("PaaS") models, including cloud-based FaaS and PaaS environments.

Although not explicitly shown in FIG. 1, one or more input-output devices such as keyboards, displays or other types of input-output devices may be used to support one or more user interfaces to the code vulnerability remediation platform 110, as well as to support communication between the code vulnerability remediation platform 110 and connected devices (e.g., user devices 102) and/or other related systems and devices not explicitly shown.

In some embodiments, the user devices 102 are assumed to be associated with repair technicians, system administrators, information technology (IT) managers, software developers or other authorized personnel configured to access and utilize the code vulnerability remediation platform 110.

The code vulnerability remediation platform 110 in the present embodiment is assumed to be accessible to the user devices 102 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The code vulnerability remediation platform 110, on behalf of respective infrastructure tenants each corresponding to one or more users associated with respective ones of the user devices 102, utilizes pattern matching and artificial intelligence (AI)/machine learning (ML) to learn and apply the vulnerability fixes on a codebase.

Figure 2:
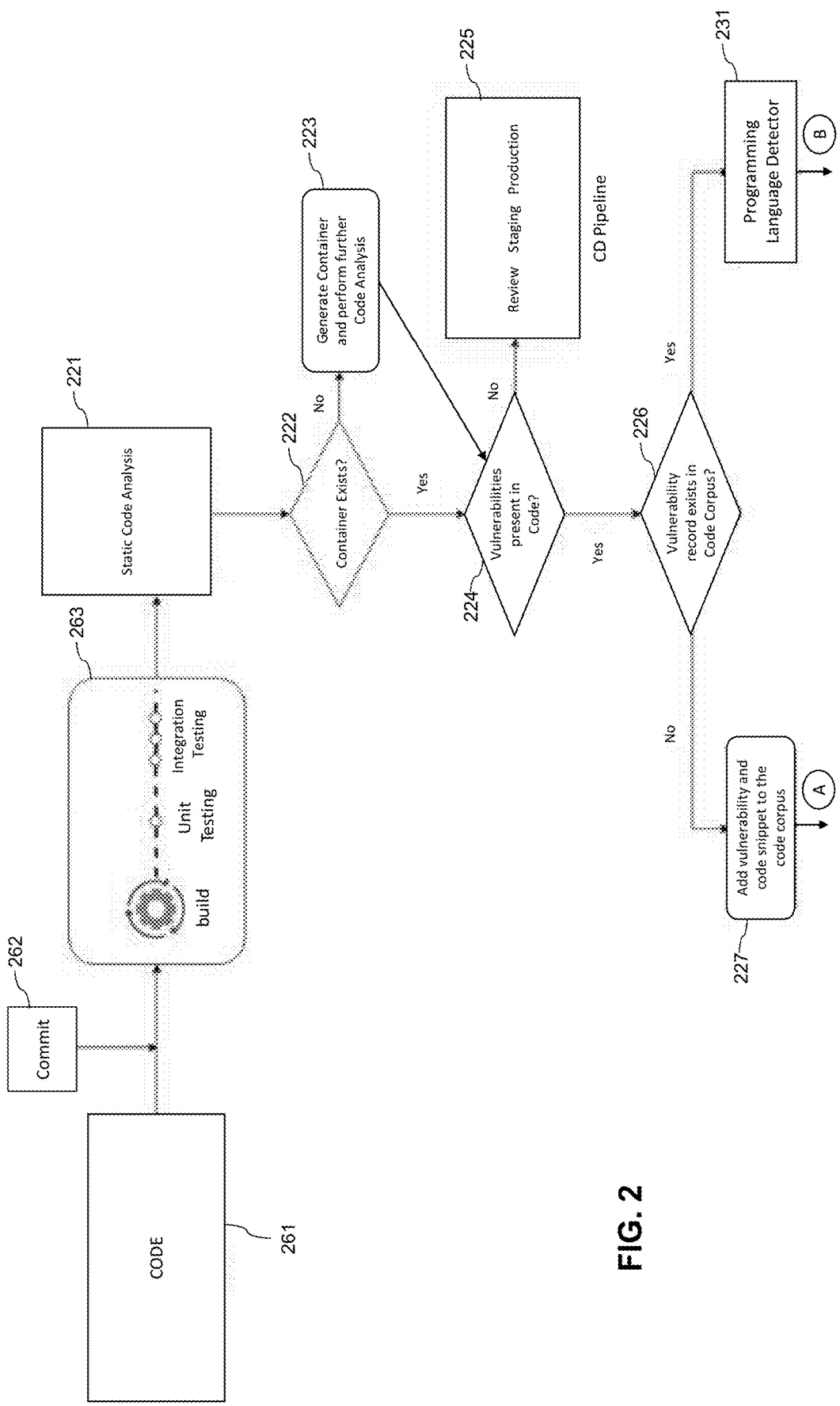
FIG. 2 is a flow diagram of an exemplary process for analyzing and processing code to determine the presence of and to eliminate code vulnerabilities in an illustrative embodiment.
Figure 2:
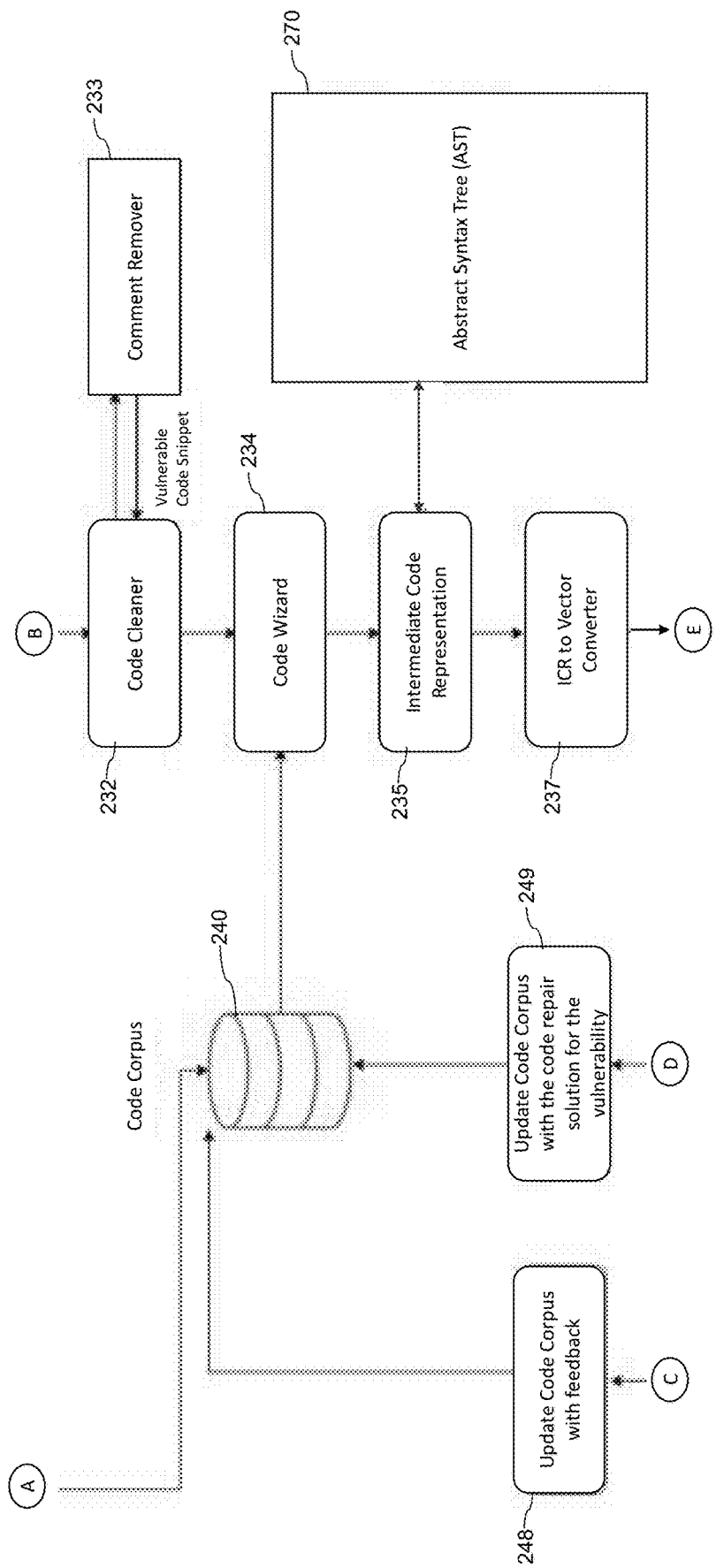
Figure 2:
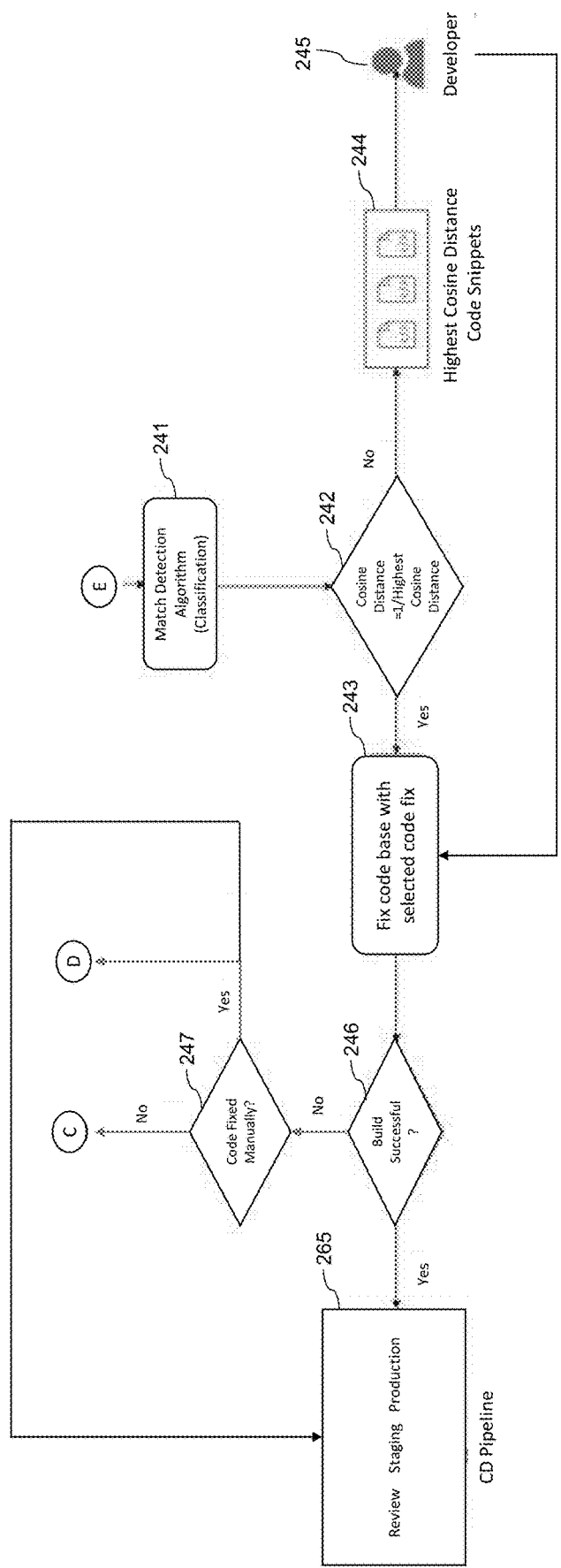
Figure 3:
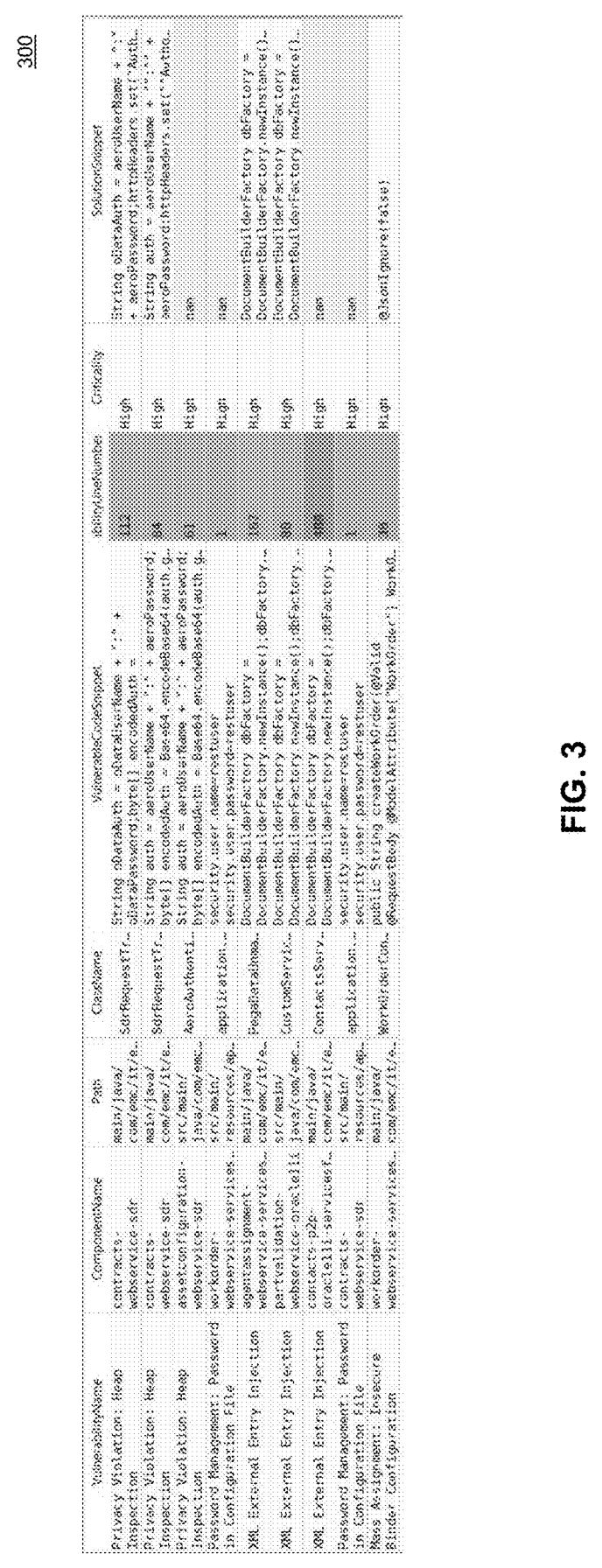

Referring to FIGS. 1 and 2, the code corpus 140/240 (also referred to herein as a "knowledge base"), is configured to store and record information relating to known vulnerabilities and actions taken to resolve the vulnerabilities. In a non-limiting example, the code corpus 140/240 includes data such as what is shown in the chart in FIG. 3. Referring to FIG. 3, the chart 300 in a first column identifies a vulnerability name and type, such as, for example, privacy violations, XML external entity injections, insecure binder configurations and password management issues. Privacy violations may occur as a result of a heap inspection by an attacker. For example, a heap inspection can read sensitive data such as passwords or encryption keys that have not been removed from memory following reallocation. Password management issues may occur, for example, when software stores a password in a configuration file. The configuration file may be accessible to attackers who can learn or alter the password. XML external entity injections allow attackers to interfere with an application's processing of XML data and, for example, permit attackers to view proprietary files, and access backend or external systems that the application accesses. Insecure binder configurations may occur when an object is allowed to be automatically instantiated and populated with HTTP request parameters whose names match an attribute of the class to be bound. The automatic instantiation and population of objects may cause attributes in bound or nested classes to be automatically bound to the HTTP request parameters. As a result, malicious users can assign a value to any attribute in bound or nested classes, even when they are not exposed to the client through, for example, web forms or application programming interface (API) contracts.

Referring further to FIG. 3, the chart 300 in the second, third and fourth columns identify components, paths and classes associated with a given vulnerability. The second column identifies "ComponentName," which refers to the name of a service for which vulnerabilities have been analyzed. The third column identifies "Path," which indicates the relative path to the class where the vulnerability was found. The fourth column, "ClassName," identifies the class file where the vulnerability was detected.

The chart 300 lists in column 5 the snippets (or fragments) of problematic code associated with the corresponding vulnerability. Column 6 of the chart 300 identifies the line number in the code where the portion of the code including the vulnerability is found. The chart 300 in column 7 identifies a criticality of the vulnerability, such as, for example, low, moderate or high.

The chart 300 in column 8 lists code snippets (or fragments) that have been modified from their problematic versions in column 5 to remove the corresponding vulnerabilities. As can be understood from the chart 300 in FIG. 3, the code corpus 140/240 is a knowledge base including code fragments with vulnerabilities and the modifications made to those code fragments in order to eliminate the code vulnerabilities. If the solution for a particular code vulnerability is not present for the corresponding ComponentName in column 2, and ClassName in column 4, column 7 is set as 'nan'. The code corpus 140/240 is a dynamic knowledge base which is continuously updated and modified based on input from an AI/ML engine 150 which, as described further herein below, uses AI/ML techniques to learn code vulnerabilities not previously in the code corpus 140/240 and the corresponding solutions to remove the code vulnerabilities.

It is to be understood that FIG. 3 is an example of the type of datasets that can be in the code corpus 140/240 and how the datasets may be organized. The embodiments are not necessarily limited to the type and organization of data shown in FIG. 3.

The code corpus 140/240 in some embodiments is implemented using one or more storage systems or devices associated with the code vulnerability remediation platform 110. In some embodiments, one or more of the storage systems utilized to implement the code corpus 140/240 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Referring to FIGS. 1 and 2, the code vulnerability remediation platform 110 receives programming code 261 (e.g., source code) from one or more user devices 102 via network 104. The code 261 received by the code vulnerability remediation platform 110 is analyzed by the code vulnerability platform 110 to determine whether the code 261 includes vulnerabilities. As shown in FIG. 2, one or more commits 262 add changes to the code 261 to a repository, and the latest version of the code 261 is built and tested (block 263). For example, following building, the code 261 is subject to unit and integration testing by the code analyzer 121. Unit testing refers to testing individual units of source code, computer program modules and associated control data, usage procedures, and operating procedures, to determine fitness for use. Integration testing groups modules that have been unit tested into larger aggregates, and applies tests to the larger aggregates to evaluate the compliance of a system or component with specified functional requirements.

The code 261 is then subject to static code analysis 221 by, for example, the code analyzer 121. Static code analysis 221 provides an understanding of the code structure, and helps to ensure that the code 261 adheres to defined standards. Static code analysis 221 identifies potential software quality and vulnerability issues during the development phase before sending the code into production. According to an embodiment, the code analyzer 121 determines whether a container for the code (e.g., a Docker container) exists. A container refers to a unit of software that packages the code and its dependencies so that an application may be efficiently executed over multiple computing environments. In some cases, code 261 may already have a container. In other cases, for example, for newly committed code, if a container does not exist (negative determination in block 222), a container setup module 123 generates a container (bock 223). Developer input may be required for container setup. Following container generation, the code analyzer 121 performs additional static code analysis (block 223).

Referring to block 224 in FIG. 2, following generation of one or more containers, or determining that one or more containers already exist (positive determination in block 222), the code analyzer 121 determines whether there are vulnerabilities in the code 261. If no vulnerabilities in the code 261 are identified, a continuous delivery (CD) pipeline is executed (block 225) where a final version of the code is reviewed, staged and produced. The CD pipeline 225 automates steps in a software delivery process, including testing and review of the code, and deploying to staging and production environments for eventual release of the software.

Referring to block 226 in FIG. 2, if vulnerabilities in the code 261 are identified, the code vulnerability remediation platform 110 performs a check to determine whether vulnerability records corresponding to the identified vulnerabilities exist in the code corpus 140/240. The vulnerability records include, for example, data similar to what is shown in the chart in FIG. 3 including the vulnerabilities, corresponding code snippets pertaining to the vulnerabilities and solution code snippets of modified code that eliminates the vulnerabilities. Referring to block 227 in FIG. 2, if vulnerability records corresponding to one or more of the identified vulnerabilities do not exist in the code corpus 140/240, a vulnerability record is created for those vulnerabilities not in the code corpus 140/240. At this stage, if there is no solution code associated with the identified vulnerabilities not in the code corpus, the newly created vulnerability record includes the vulnerability, the corresponding code snippet pertaining to the vulnerability, and other available data, such as, for example, criticality, line number, etc.

Referring to block 231 in FIG. 2, if the code vulnerability remediation platform 110 determines that vulnerability records corresponding to one or more of the identified vulnerabilities already exist in the code corpus 140/240, a programming language detector 131/231 determines the programming language associated with the code including the vulnerability(ies). For example, the programming language of the code may include, but is not necessarily limited to, Java, JavaScript, Python, C, C++, SQL, etc. FIG. 4 depicts example pseudocode 400 for detecting a programming language in an illustrative embodiment. Referring to FIG. 4, some embodiments utilize client libraries (e.g., Algorithmia®) corresponding to different languages to detect the programming language input and identify programming languages.

According to the embodiments, the platform 110 is universal with respect to programming language of code containing vulnerabilities, and is configured to learn and apply vulnerability fixes on a codebase regardless of programming language. As explained further herein, based on the determined programming language of the code snippets containing the vulnerabilities, the platform 110 performs further operations on the code snippets to generate code vectors representative of the logic of the code snippets. As explained further herein, according to an embodiment, the platform 110 represents the abstract syntactic structure of source code written in a given programming language in an abstract syntax tree (AST). An AST does not represent every detail appearing in code syntax, but rather just the structural or content-related details. For example, an AST does not include grouping parentheses or syntactic constructs like conditional statements (e.g., "if-then" statements).

Following determination of the programming language, a code cleaner 132/232 and a comment remover 133/233 sanitize the code snippets by, for example, removing unnecessary white spaces, removing commented lines and removing information lines from the codebase. FIG. 5 depicts example pseudocode 500 for sanitizing the code snippets in an illustrative embodiment. For example, the pseudocode 500 includes instructions for removing Java and Python comments. A code wizard 134/234 converts the sanitized code snippets to an intermediate code representation (ICR) 135/235, which, according to an embodiment, is an AST 270.

Figure 7:
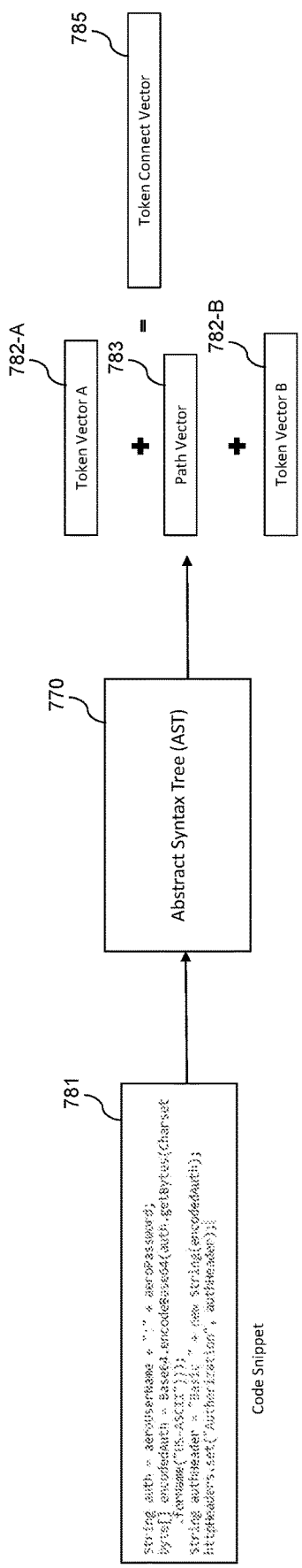
FIG. 7 is a block diagram illustrating conversion of a portion of code to an abstract syntax tree (AST) and vectors corresponding to the AST in an illustrative embodiment.
Figure 9:
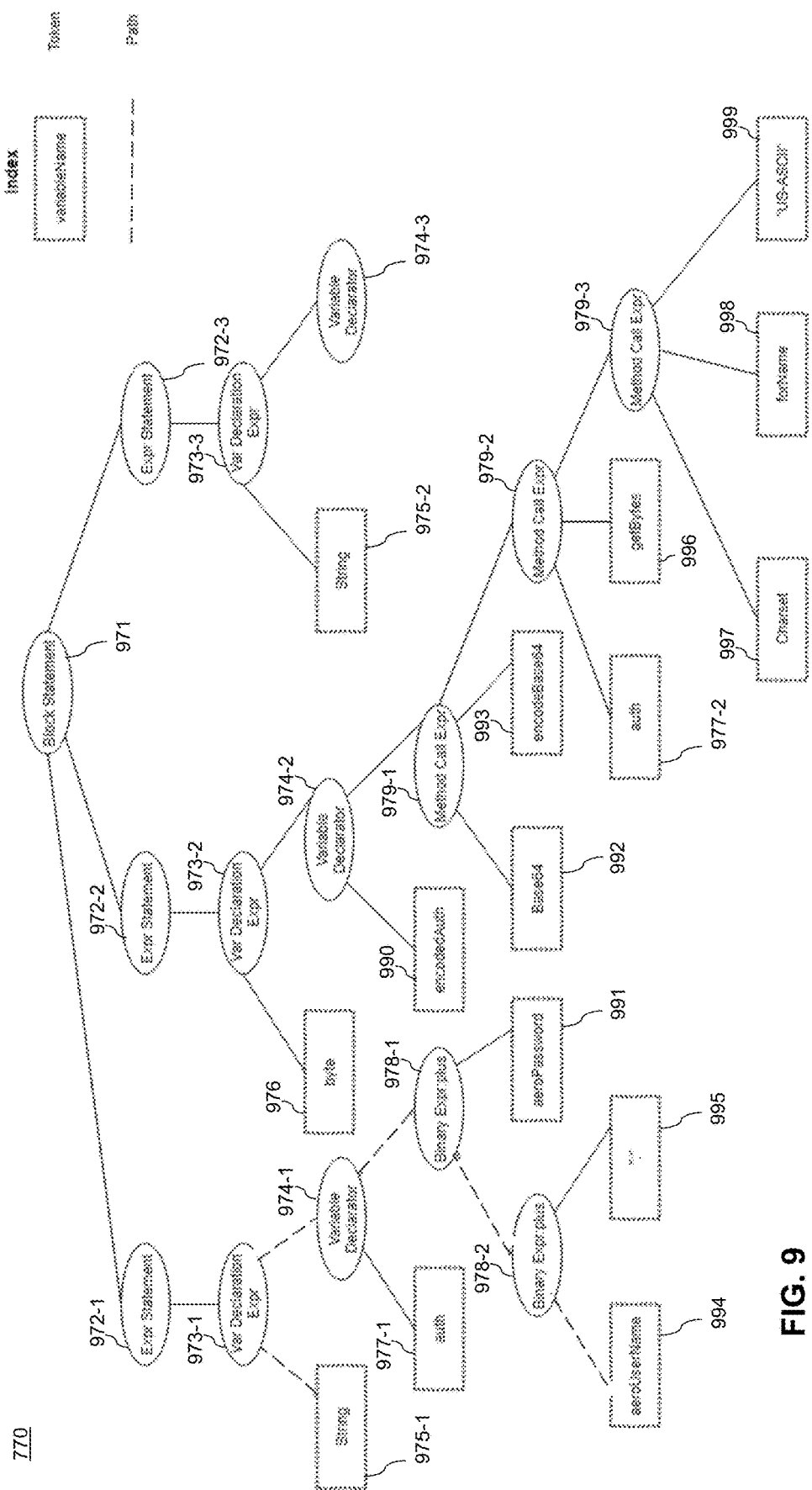
FIG. 9 is a block diagram of an abstract syntax tree (AST) in an illustrative embodiment.

An ICR to vector converter 137/237 converts the ICR (e.g., AST) to vector format. Referring to FIG. 7, the platform 110 converts a code snippet 781 including one or more vulnerabilities into an AST 770. As can be seen in FIG. 7, a given token vector A 782-A+a path vector 783+a given token vector B 782-B in the AST 770 result in a token connect vector 785. There can be multiple token connect vectors associated with a given code snippet. For example, there are multiple token connect vectors in the AST 770 associated with code snippet 781 (see AST 770 in FIG. 9). The path vector 783 links the token vectors A and B 782-A, 782-B. Token vectors in the AST 770 correspond to variables (tokens) in the code snippet 781, such as, for example, String, auth, aeroUserName, aeroPassword, each corresponding to their own token vector. For example, String constitutes a first token vector (e.g., token vector A 782-A) and aeroUserName constitutes a second token vector (e.g., token vector B 782-B). Referring to the AST 770 in FIG. 9, the tokens (e.g., variables) are shown in dashed boxes as String 975-1, auth 977-1, aeroUserName 994, 995, aeroPassword 991, byte 976, encodedAuth 990, Base64 992, encodedBase64 993, auth (second occurrence) 977-2, getBytes 996, Charset 997, forName 998, "US-ASCII" 999, and String (second occurrence) 975-2. Paths connect the tokens, indicating the significance between variables. In FIG. 9, the dotted lines provide a visual representation of a path between String 975-1 and aeroUserName 994. It is to be understood that there can be a path between any token vectors. For example, although not shown with dotted lines in FIG. 9, a path can exist between String 975-1 and aeroPassword 991. There is only one path between two distinct token vectors. In FIG. 9, the lines connecting two tokens represent a path.

In FIG. 9, the ovals (e.g., block statement 971, expr statement 972-1, 972-2 and 972-3, var declaration expr 973-1, 973-2 and 973-3, variable declarator 974-1, 974-2 and 974-3, binary expr: plus 978-1 and 978-2, and method call expr 979-1, 979-2 and 979-3) denote different types of operations or declarations that are being performed in a code snippet. The oval denotes a construct occurring in the source code. In general, the oval structure defines structural or content related details which are similar for code snippets of all programming language. For example, a block statement defines that the given code snippet is a code block, expr statement defines that a statement performs an operation between the variables, and binary expr:plus denotes two operations being performed between two variables/tokens.

Figure 8:
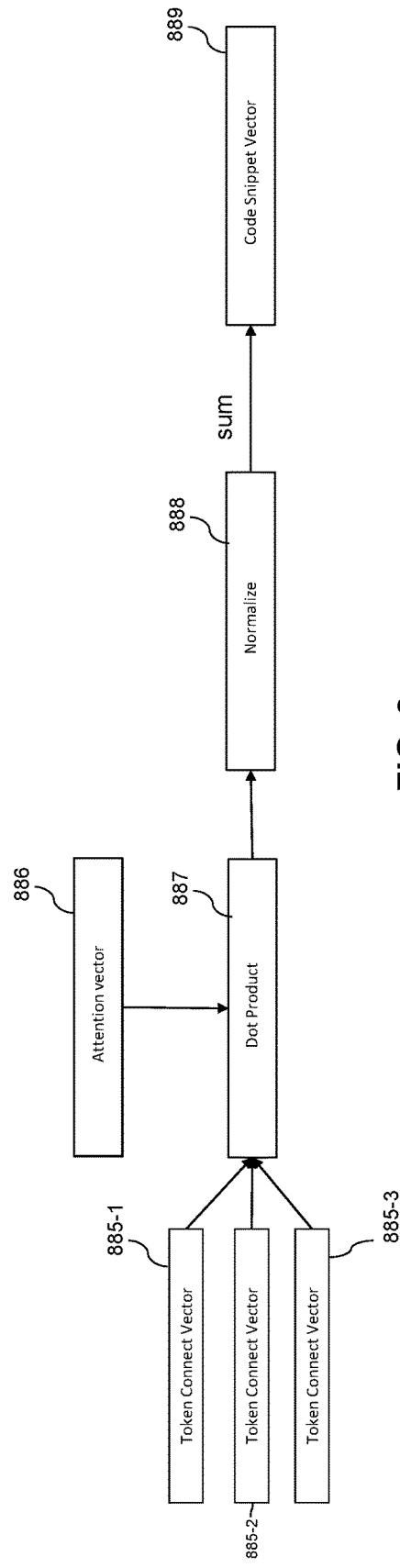
FIG. 8 is a block diagram illustrating combining of multiple token connect vectors to result in a vector representing a portion of code in an illustrative embodiment.

Referring to FIGS. 1, 2 and 8, the ICR to vector converter 137/237 calculates a dot product 887 of a plurality of token connect vectors 885-1, 885-2 and 885-3 from the AST 770 and an attention vector 886. The attention vector 886 indicates how much weight or attention should be given to each of the token connect vectors 885-1, 885-2 and 885-3. The determination of how much weight or attention should be given to each of the token connect vectors 885-1, 885-2 and 885-3 is performed during model training based on AI/ML techniques used by the AI/ML engine 150. For example, each of the token connect vectors is formed by a concatenation of three independent vectors. A fully connected layer learns to combine its components, and for each token connect vector this is done separately. This allows the model to give different attention or weight to different combinations of paths and values. For example, the model has the flexibility of assigning a certain path with relatively high attention when observed with a particular value and relatively low attention when the exact same path is observed with another value. The attention mechanism computes the weighted average over combined context vectors. According to one or more embodiments, an attention vector is initialized randomly and learned simultaneously within a network. Attention can be viewed as a weighted average, where the weights are learned and calculated with respect to other members in a group of token connect vectors.

According to embodiment, the dot product 887 is normalized 888 in a range of, for example, −1 to 1. Then, the normalized dot products of different groups of token connect vectors and attention vectors are added together to result in a code snippet vector 889, which is the code vector representation for a given code snippet, such as, for example, code snippet 781.

Following conversion of the ICR to the code vector representation for a given code snippet, a match detection module 141 implements a match detection algorithm 241 to determine a classification for the code vector representation. According to an embodiment, the match detection module 141 compares code vector representations corresponding to the code snippets including one or more identified vulnerabilities to code vector representations in the code corpus 140/240. The code vector representations in the code corpus 140/240 correspond to a plurality of code snippets with vulnerabilities and solutions which populate the code corpus 140/240.

According to one or more embodiments, the match detection algorithm 241 determines cosine distances between the code vector representations derived by the ICR to vector converter 137/237 and to the plurality of code vector representations in the code corpus 140/240. FIG. 6 depicts example pseudocode 600 for calculating the cosine distances in an illustrative embodiment. The match detection module 141 can use natural language processing (NLP) in connection with determining cosine distances.

A cosine distance of 1 between a code vector representation derived by the ICR to vector converter 137/237 and one of the code vector representations in the code corpus 140/240 indicates a match with a code vector representation in the code corpus 140/240. Referring to blocks 242 and 243 of FIG. 2, if the cosine distance between a code vector representation derived by the ICR to vector converter 137/237 and one of the code vector representations in the code corpus 140/240 is determined to be equal to 1, the code repair/building component 143 of the platform 110 uses the solution associated with the matching code vector representation from the code corpus 140/240 to remove the vulnerability from the inputted code. The matching code vector representation in the code corpus 140/240 will have a solution code snippet associated therewith that eliminates the code vulnerability. The code repair/building component 143 uses this associated solution to modify the incoming code 261 to remove the vulnerability and build new code that does not include the vulnerability.

Referring to block 246 in FIG. 2, if the building of the new code is successful, a CD pipeline is executed (block 265) where a final version of the code is reviewed, staged and produced. The CD pipeline 265 is similar to the CD pipeline 225 discussed herein above. If the building of the new code is not successful due to, for example, a semantic error(s) (e.g., missing characters or commands), a developer can be notified for a manual fix of the error(s). Following a manual fix of the code (positive determination in block 247), the code corpus 240 is updated with the code repair solution for a given vulnerability (block 249). Whether the build is successful with or without manual intervention, feedback is provided to the feedback and training component 151 of the AI/ML engine 150 regarding the outcome of the build using the solution from the code corpus 140/240. Feedback is also provided to the feedback and training component 151 of the AI/ML engine 150, and to the code corpus (block 248) when the build is not successful and the code is not able to be fixed manually (negative determination in block 247).

Referring to blocks 242 and 244, in the event that none of the code vector representations in the code corpus 140/240 are found to have a cosine distance equal to 1 when compared with the code vector representation derived by the ICR to vector converter 137/237, the match detection module 141 concludes that there is no match with a code vector representation in the code corpus 140/240. In this case, the match detection module 141 determines which of the code vector representations in the code corpus have the closest cosine distance to 1 (e.g., highest cosine distance less than 1) (e.g., 0.8, 0.9), and supplies the code fragment solutions associated with these closest code vector representations to a developer 245. The developer then determines which, if any, of the supplied code fragment solutions to use to eliminate the vulnerability from the code 261. The match detection module 141 may select, for example, the code fragment solutions associated with a predetermined number if the closest code vector representations to send a developer 245 (e.g., the top three closest code vector representations). Once the developer 245 determines which, if any, of the supplied code fragment solutions to use to eliminate the vulnerability from the code 261, referring to block 243, the code repair/building module 143 performs processing to generate new code free of the vulnerability based on the selected solution. Feedback is provided to the feedback and training component 151 of the AWL engine 150 regarding the solution chosen by the developer to eliminate the vulnerability.

The AI/ML engine 150 is configured to compile information and feedback regarding determined similarities between data in the code corpus 140/240 and incoming code 261, and the success of solutions that have been implemented to remove vulnerabilities from the incoming code. Based on this information and feedback, the AI/ML engine 150 uses machine learning techniques to learn what solutions are appropriate for different types of code and/or vulnerabilities. In addition, the AI/ML engine 150 compiles information and feedback regarding whether certain solutions have been chosen by developers to fix code vulnerabilities. For example, when cosine distances in connection with comparisons of code vector representations derived from incoming code and code corpus code vector representations are not equal to 1, the AWL engine 150 analyzes the number of times respective solutions are chosen by developers, and whether the chosen solutions are successful in removing vulnerabilities from the code. Based on this information and feedback, the AI/ML engine 150 uses machine learning techniques to predict the best solutions for code vulnerabilities and snippets not previously in the code corpus 140/240 and dynamically adds new entries to the code corpus 140/240 comprising the vulnerable code snippets and their corresponding solutions. The AI/ML engine 150 is also configured to modify solutions currently in the code corpus 140/240 based on changes made to the solutions to make builds successful after a failure. Such changes may originate from manual fixes performed on code as noted in connection with block 247. The AI/ML engine 150 is also configured to learn from solutions currently in the code corpus 140/240 that resulted in failed builds and were not able to be manually fixed. In this case, the AWL engine 150 may identify a pattern of failure, determine that certain solutions are not effective, and possibly remove these unworkable solutions for the code corpus 140/240.

According to illustrative embodiments, referring to block 248 in FIG. 2, the updates to the code corpus 140/240 can be generated using a machine learning model (e.g., linear regression, neural network, Support Vector Machine (SVM), Multilayer Perceptron (MLP), a deep learning model, decision trees and/or clustering) based on training data sets collected by the feedback and training component 151.

Although shown as an element of the code vulnerability platform 110 in this embodiment, the AI/ML, engine 150 in other embodiments can be implemented at least in part externally to the code vulnerability platform 110, for example, as a stand-alone server, set of servers or other type of system coupled to the network 104. For example, the AWL engine 150 may be provided as a cloud service accessible by the code vulnerability platform 110.

The AWL engine 150 in the FIG. 1 embodiment is assumed to be implemented using at least one processing device. Each such processing device generally comprises at least one processor and an associated memory, and implements one or more functional modules for controlling certain features of AI/ML engine 150.

At least portions of the code vulnerability remediation platform 110 and the components thereof may be implemented at least in part in the form of software that is stored in memory and executed by a processor. The code vulnerability remediation platform 110 and the components thereof comprise further hardware and software required for running the code vulnerability remediation platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the code analyzer 121, container setup module 123, programming language detector 131, code cleaner 132, comment remover 133, code wizard 134, ICR module 135, ICR to vector converter 137, code corpus 140, match detection module 141, code repair/building module 143, AWL engine 150 and other components of the code vulnerability remediation platform 110 in the present embodiment are shown as part of the code vulnerability remediation platform 110, at least a portion of the code analyzer 121, container setup module 123, programming language detector 131, code cleaner 132, comment remover 133, code wizard 134, ICR module 135, ICR to vector converter 137, code corpus 140, match detection module 141, code repair/building module 143, AWL engine 150 and other components of the code vulnerability remediation platform 110 in other embodiments may be implemented on one or more other processing platforms that are accessible to the code vulnerability remediation platform 110 over one or more networks. Such components can each be implemented at least in part within another system element or at least in part utilizing one or more stand-alone components coupled to the network 104.

It is assumed that the code vulnerability remediation platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the code analyzer 121, container setup module 123, programming language detector 131, code cleaner 132, comment remover 133, code wizard 134, ICR module 135, ICR to vector converter 137, code corpus 140, match detection module 141, code repair/building module 143, AWL engine 150 and other components of the code vulnerability remediation platform 110, and the elements thereof can each be implemented in the form of one or more LXCs running on one or more VMs. Other arrangements of one or more processing devices of a processing platform can be used to implement the code analyzer 121, container setup module 123, programming language detector 131, code cleaner 132, comment remover 133, code wizard 134, ICR module 135, ICR to vector converter 137, code corpus 140, match detection module 141, code repair/building module 143, and AWL engine 150, as well as other components of the code vulnerability remediation platform 110. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the code vulnerability remediation platform 110 to reside in different data centers. Numerous other distributed implementations of the code vulnerability remediation platform 110 are possible.

Accordingly, one or each of the code analyzer 121, container setup module 123, programming language detector 131, code cleaner 132, comment remover 133, code wizard 134, ICR module 135, ICR to vector converter 137, code corpus 140, match detection module 141, code repair/building module 143, AWL engine 150 and other components of the code vulnerability remediation platform 110 can each be implemented in a distributed manner so as to comprise a plurality of distributed components implemented on respective ones of a plurality of compute nodes of the code vulnerability remediation platform 110.

It is to be appreciated that these and other features of illustrative embodiments are presented by way of example only, and should not be construed as limiting in any way.

Accordingly, different numbers, types and arrangements of system components such as the code analyzer 121, container setup module 123, programming language detector 131, code cleaner 132, comment remover 133, code wizard 134, ICR module 135, ICR to vector converter 137, code corpus 140, match detection module 141, code repair/building module 143, AWL engine 150 and other components of the code vulnerability remediation platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the code vulnerability remediation platform can be offered to cloud infrastructure customers or other users as part of FaaS and/or PaaS offerings.

Figure 10:
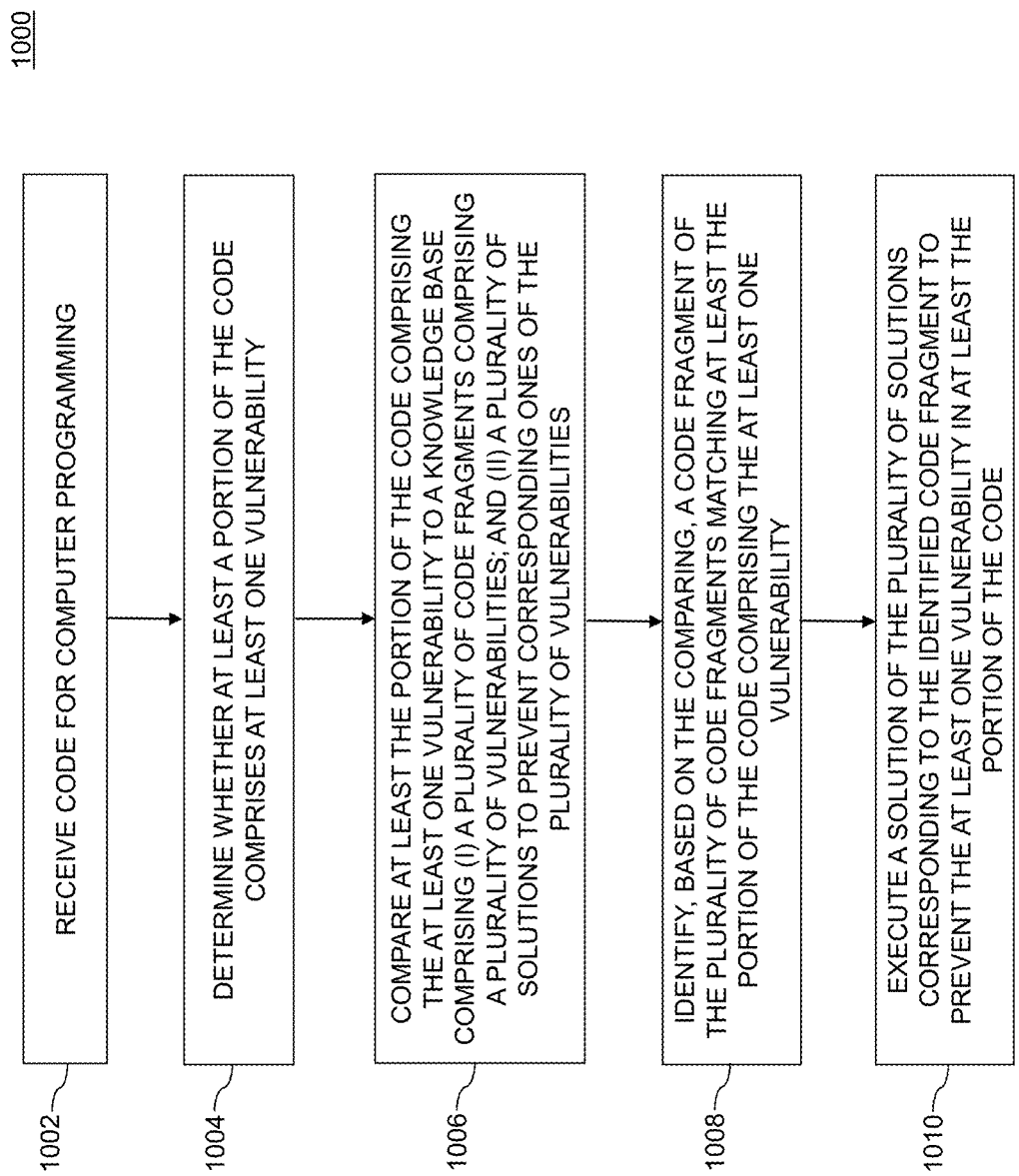
FIG. 10 is a flow diagram of a process for identifying and eliminating vulnerabilities in code in an illustrative embodiment.

The operation of the information processing system 100 will now be described in further detail with reference to the flow diagram of FIG. 10. With reference to FIG. 10, a process 1000 for identifying and eliminating vulnerabilities in code as shown includes steps 1002 through 1010, and is suitable for use in the system 100 but is more generally applicable to other types of information processing systems comprising a code vulnerability remediation platform configured for identifying and eliminating vulnerabilities in code.

In steps 1002 and 1004, computer programming code is received and a determination is made whether at least a portion of the code comprises at least one vulnerability. In step 1006, at least a portion of the code comprising the at least one vulnerability is compared to a knowledge base. The knowledge base (e.g., code corpus 140/240) comprises (i) a plurality of code fragments (e.g., snippets) comprising a plurality of vulnerabilities; and (ii) a plurality of solutions to prevent corresponding ones of the plurality of vulnerabilities. In accordance with an embodiment, the method also includes determining that the at least one vulnerability is absent from the knowledge base, and adding the at least one vulnerability and at least the portion of the code to the knowledge base.

The method can include converting at least the portion of the code comprising the at least one vulnerability into a code vector representation, which is independent of a programming language of the code. Converting at least the portion of the code comprising the at least one vulnerability into the code vector representation may include converting at least the portion of the code comprising the at least one vulnerability into an intermediate code representation. The intermediate code representation may comprise an AST.

Comparing at least the portion of the code comprising the at least one vulnerability to the knowledge base may include comparing the code vector representation to a plurality of code vector representations corresponding to the plurality of code fragments in the knowledge base, and determining a cosine distance between the code vector representation and the plurality of code vector representations.

In step 1008, the method further includes identifying, based on the comparing, a code fragment of the plurality of code fragments matching at least the portion of the code comprising the at least one vulnerability. In step 1010, the method includes executing a solution of the plurality of solutions corresponding to the identified code fragment to prevent the at least one vulnerability in at least the portion of the code. Executing the solution may include generating new code without the at least one vulnerability. One or more machine learning algorithms may be applied to update the knowledge base with data corresponding to the generation of the new code. The method can also include determining a programming language of the code, and sanitizing at least the portion of the code comprising the at least one vulnerability. Sanitizing at least the portion of the code comprising the at least one vulnerability can include removing one or more comments from at least the portion of the code comprising the at least one vulnerability.

According to one or more embodiments, the method also includes identifying, based on the comparing, one or more code fragments of the plurality of code fragments which may correspond to at least the portion of the code comprising the at least one vulnerability, and transmitting to a user one or more recommended solutions of the plurality of solutions corresponding to the identified one or more code fragments to prevent the at least one vulnerability in at least the portion of the code. A selection of a recommended solution of the one or more recommended solutions is received from the user, and one or more machine learning algorithms are applied to update the knowledge base with data corresponding to a relationship between at least the portion of the code comprising the at least one vulnerability and the selected recommended solution.

It is to be appreciated that the FIGS. 2 and 10 processes and other features and functionality described above can be adapted for use with other types of information systems configured to execute code vulnerability remediation services on a code vulnerability remediation platform or other type of processing platform.

The particular processing operations and other system functionality described in conjunction with the flow diagrams of FIGS. 2 and 10 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagrams of FIGS. 2 and 10 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with code vulnerability remediation platform as disclosed herein can provide a number of significant advantages relative to conventional arrangements. For example, one or more embodiments are configured to provide self-learning vulnerable code analysis and fixing tool that enables enterprises to repair vulnerable code in a secure and seamless way with minimal or no human effort. The embodiments eliminate repetitive efforts to fix vulnerabilities in complex codebases. Advantageously, the embodiments are scalable and adaptable to secure existing code repositories and to add the latest security standards and new security code monitoring enhancements.

These conventional approaches waste computational resources by requiring developers frequently and iteratively perform security scans and vulnerability fixes. As can be understood, conventional approaches, to their detriment, require excessive manual intervention to adhere to security guidelines and to make existing deployed codebase compliant with the latest security standards.

Currently, there are no techniques or solutions for identifying and eliminating vulnerabilities in code which are universal to multiple programming languages and can be performed on a common platform available for all integration applications. With current solutions, minor code changes require performance of security scans, analysis and vulnerability fixes over an entire codebase instead of just analyzing and fixing added portions of code.

In addition, unlike former approaches, the illustrative embodiments provide a comprehensive solution utilizing pattern matching and AI/ML to learn and apply vulnerability fixes on a codebase autonomously with minimal or no user input. The embodiments permit scanning and securing code for multiple middleware products on a single platform as per the latest security standards. The embodiments not only fix existing vulnerabilities, but also learn new vulnerabilities and solutions so that the system automatically matures to protect against the latest threat fixes over time.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the code vulnerability remediation platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a code vulnerability remediation platform in illustrative embodiments. These and other cloud-based systems in illustrative embodiments can include object stores.

Illustrative embodiments of processing platforms will now be described in greater detail with reference to FIGS. 11 and 12. Although described in the context of system 100, these platforms may also be used to implement at least portions of other information processing systems in other embodiments.

Figure 11:
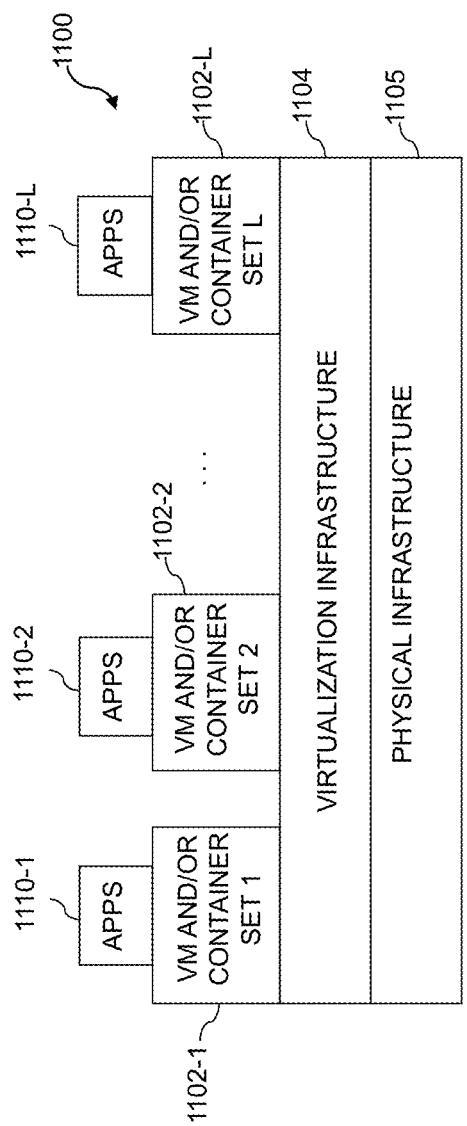
FIGS. 11 and 12 show examples of processing platforms that may be utilized to implement at least a portion of an information processing system in illustrative embodiments.
Figure 12:
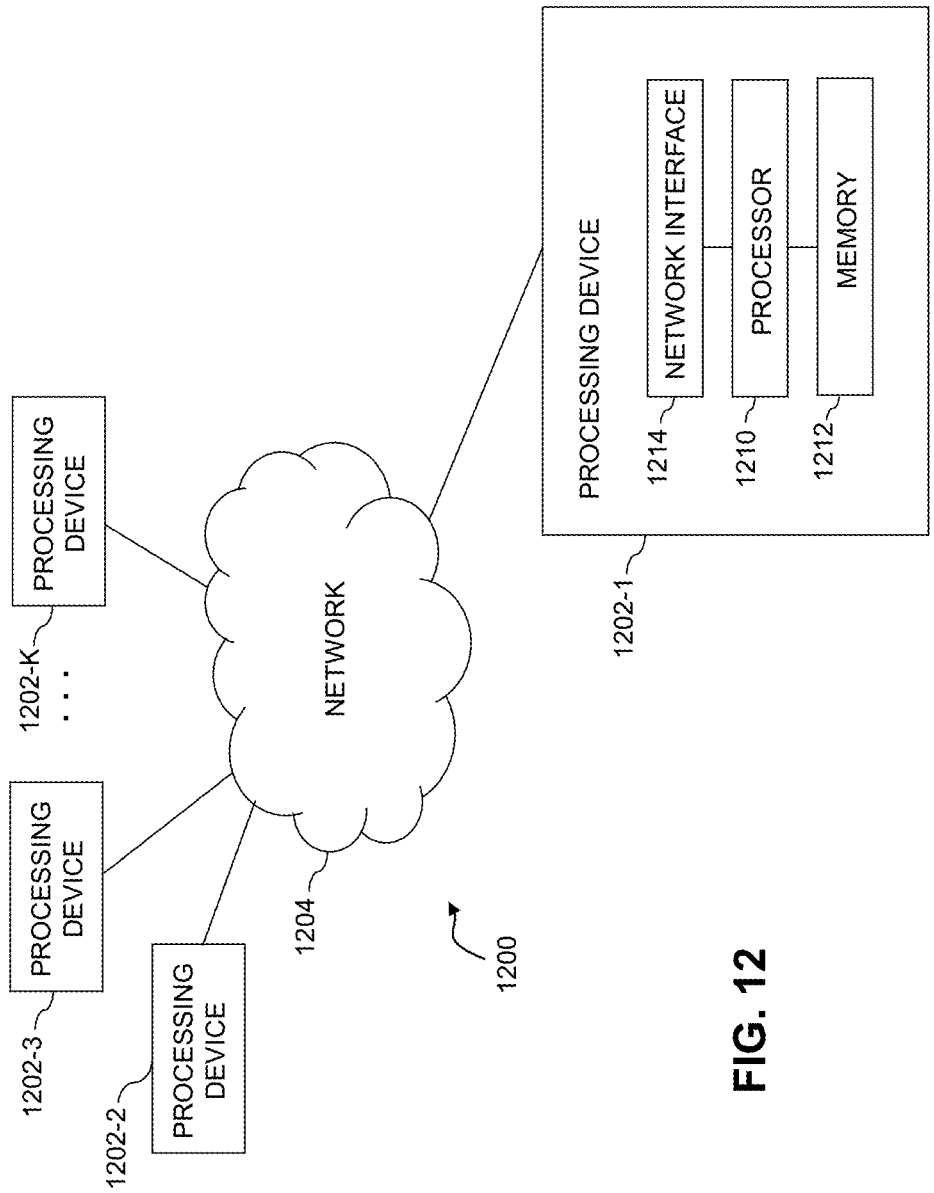

FIG. 11 shows an example processing platform comprising cloud infrastructure 1100. The cloud infrastructure 1100 comprises a combination of physical and virtual processing resources that may be utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. A hypervisor platform may be used to implement a hypervisor within the virtualization infrastructure 1104, where the hypervisor platform has an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212. The processor 1210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the code vulnerability remediation platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and code vulnerability remediation platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing platform comprising at least one processor coupled to a memory; and
   said at least one processing platform being configured:
   to receive code for computer programming;
   to determine whether at least a portion of the code comprises at least one vulnerability;
   to compare at least the portion of the code comprising the at least one vulnerability to a knowledge base comprising (i) a plurality of code fragments comprising a plurality of vulnerabilities; and (ii) a plurality of solutions to prevent corresponding vulnerabilities of the plurality of vulnerabilities;
   to identify, based on the comparing, a code fragment of the plurality of code fragments matching at least the portion of the code comprising the at least one vulnerability;
   to execute a solution of the plurality of solutions corresponding to the identified code fragment of the plurality of code fragments to prevent the at least one vulnerability in at least the portion of the code; and
   to convert at least the portion of the code comprising the at least one vulnerability into a code vector representation, wherein, in converting at least the portion of the code comprising the at least one vulnerability into the code vector representation, said at least one processing platform is configured:
   to convert at least the portion of the code comprising the at least one vulnerability into an intermediate code representation comprising a plurality of variable connection vectors; and
   to combine the plurality of variable connection vectors and at least one weight vector, wherein the code vector representation is based, at least in part, on the combination of the plurality of variable connection vectors and the at least one weight vector.

2. The apparatus of claim 1 wherein the code vector representation is independent of a programming language of the code.

3. The apparatus of claim 1 wherein, in comparing at least the portion of the code comprising the at least one vulnerability to the knowledge base, said at least one processing platform is further configured to compare the code vector representation to a plurality of code vector representations corresponding to the plurality of code fragments in the knowledge base.

4. The apparatus of claim 3 wherein, in comparing at least the portion of the code comprising the at least one vulnerability to the knowledge base, said at least one processing platform is further configured to determine a cosine distance between the code vector representation and the plurality of code vector representations.

5. The apparatus of claim 1 wherein the intermediate code representation comprises an abstract syntax tree.

6. The apparatus of claim 1 wherein said at least one processing platform is further configured to determine a programming language of the code.

7. The apparatus of claim 1 wherein said at least one processing platform is further configured to sanitize at least the portion of the code comprising the at least one vulnerability.

8. The apparatus of claim 7 wherein, in sanitizing at least the portion of the code comprising the at least one vulnerability, said at least one processing platform is further configured to remove one or more comments from at least the portion of the code comprising the at least one vulnerability.

9. The apparatus of claim 1 wherein, in executing the solution of the plurality of solutions corresponding to the identified code fragment of the plurality of code fragments, said at least one processing platform is further configured to generate new code without the at least one vulnerability.

10. The apparatus of claim 9 wherein said at least one processing platform is further configured to apply one or more machine learning algorithms to update the knowledge base with data corresponding to the generation of the new code without the at least one vulnerability.

11. The apparatus of claim 1 wherein said at least one processing platform is further configured:
    to identify, based on the comparing, one or more code fragments of the plurality of code fragments which correspond to at least the portion of the code comprising the at least one vulnerability; and
    to transmit to a user one or more recommended solutions of the plurality of solutions corresponding to the identified one or more code fragments of the plurality of code fragments to prevent the at least one vulnerability in at least the portion of the code comprising the at least one vulnerability.

12. The apparatus of claim 11 wherein said at least one processing platform is further configured:
to receive from the user a selection of a recommended solution of the one or more recommended solutions of the plurality of solutions; and
to apply one or more machine learning algorithms to update the knowledge base with data corresponding to a relationship between at least the portion of the code comprising the at least one vulnerability and the selected recommended solution of the one or more recommended solutions of the plurality of solutions.

13. The apparatus of claim 1 wherein said at least one processing platform is further configured:
to determine that the at least one vulnerability is absent from the knowledge base; and
to add the at least one vulnerability and at least the portion of the code comprising the at least one vulnerability to the knowledge base.

14. A method comprising:
receiving code for computer programming;
determining whether at least a portion of the code comprises at least one vulnerability;
comparing at least the portion of the code comprising the at least one vulnerability to a knowledge base comprising (i) a plurality of code fragments comprising a plurality of vulnerabilities; and (ii) a plurality of solutions to prevent corresponding vulnerabilities of the plurality of vulnerabilities;
identifying, based on the comparing, a code fragment of the plurality of code fragments matching at least the portion of the code comprising the at least one vulnerability;
executing a solution of the plurality of solutions corresponding to the identified code fragment of the plurality of code fragments to prevent the at least one vulnerability in at least the portion of the code; and
converting at least the portion of the code comprising the at least one vulnerability into a code vector representation, wherein converting at least the portion of the code comprising the at least one vulnerability into the code vector representation comprises:
converting at least the portion of the code comprising the at least one vulnerability into an intermediate code representation comprising a plurality of variable connection vectors; and
combining the plurality of variable connection vectors and at least one weight vector, wherein the code vector representation is based, at least in part, on the combination of the plurality of variable connection vectors and the at least one weight vector;
wherein the method is performed by at least one processing platform comprising at least one processor coupled to a memory.

15. The method of claim 14 wherein comparing at least the portion of the code comprising the at least one vulnerability to the knowledge base further comprises comparing the code vector representation to a plurality of code vector representations corresponding to the plurality of code fragments in the knowledge base.

16. The method of claim 15 wherein comparing at least the portion of the code comprising the at least one vulnerability to the knowledge base further comprises determining a cosine distance between the code vector representation and the plurality of code vector representations.

17. A computer program product comprising a non-transitory processor-readable storage medium having stored therein program code of one or more software programs, wherein the program code of the one or more software programs when executed by at least one processing platform causes said at least one processing platform:
to receive code for computer programming;
to determine whether at least a portion of the code comprises at least one vulnerability;
to compare at least the portion of the code comprising the at least one vulnerability to a knowledge base comprising (i) a plurality of code fragments comprising a plurality of vulnerabilities; and (ii) a plurality of solutions to prevent corresponding vulnerabilities of the plurality of vulnerabilities;
to identify, based on the comparing, a code fragment of the plurality of code fragments matching at least the portion of the code comprising the at least one vulnerability;
to execute a solution of the plurality of solutions corresponding to the identified code fragment of the plurality of code fragments to prevent the at least one vulnerability in at least the portion of the code; and
to convert at least the portion of the code comprising the at least one vulnerability into a code vector representation, wherein, in converting at least the portion of the code comprising the at least one vulnerability into the code vector representation, the program code of the one or more software programs causes said at least one processing platform:
to convert at least the portion of the code comprising the at least one vulnerability into an intermediate code representation comprising a plurality of variable connection vectors; and
to combine the plurality of variable connection vectors and at least one weight vector, wherein the code vector representation is based, at least in part, on the combination of the plurality of variable connection vectors and the at least one weight vector.

18. The computer program product of claim 17 wherein, in comparing at least the portion of the code comprising the at least one vulnerability to the knowledge base, the program code of the one or more software programs further causes said at least one processing platform to compare the code vector representation to a plurality of code vector representations corresponding to the plurality of code fragments in the knowledge base.

19. The computer program product of claim 18 wherein, in comparing at least the portion of the code comprising the at least one vulnerability to the knowledge base, the program code of the one or more software programs further causes said at least one processing platform to determine a cosine distance between the code vector representation and the plurality of code vector representations.

20. The computer program product of claim 17 wherein, in executing the solution of the plurality of solutions corresponding to the identified code fragment of the plurality of code fragments, the program code of the one or more software programs further causes said at least one processing platform to generate new code without the at least one vulnerability.

* * * * *